(12) United States Patent
Gurney

(10) Patent No.: US 10,330,185 B2
(45) Date of Patent: Jun. 25, 2019

(54) TORQUE CONVERTER WITH A FINGER-TABBED BRAZED INERTIA RING

(71) Applicant: Schaeffler Technologies AG & Co. KG, Herzogenaurach (DE)

(72) Inventor: Nigel C. Gurney, Wooster, OH (US)

(73) Assignee: Schaeffler Technologies AG & Co. KG, Herogenaurach (DE)

( * ) Notice: Subject to any disclaimer, the term of this patent is extended or adjusted under 35 U.S.C. 154(b) by 215 days.

(21) Appl. No.: 15/361,545

(22) Filed: Nov. 28, 2016

(65) Prior Publication Data
US 2018/0149248 A1 May 31, 2018

(51) Int. Cl.
*F16H 41/24* (2006.01)
*F16H 41/28* (2006.01)
*F16H 45/02* (2006.01)

(52) U.S. Cl.
CPC ............. *F16H 41/24* (2013.01); *F16H 41/28* (2013.01); *F16H 2045/021* (2013.01); *F16H 2045/0263* (2013.01); *F16H 2045/0294* (2013.01)

(58) Field of Classification Search
CPC ........................................................ F16H 41/24
USPC .......................................................... 60/330
See application file for complete search history.

(56) References Cited

U.S. PATENT DOCUMENTS

| | | | |
|---|---|---|---|
| 3,275,108 A * | 9/1966 | General | F16H 61/14 192/3.3 |
| 4,844,216 A | 7/1989 | Fukushima | |
| 5,195,621 A | 3/1993 | Dull et al. | |
| 6,026,940 A | 2/2000 | Sudau | |
| 6,648,112 B2 | 11/2003 | Suzuki | |
| 6,789,446 B2 | 9/2004 | Ishikawa | |
| 8,763,775 B2 | 7/2014 | Vanni et al. | |
| 2004/0226794 A1 | 11/2004 | Sasse et al. | |
| 2007/0253823 A1 * | 11/2007 | Parks | F16H 41/28 416/219 R |
| 2008/0149440 A1 * | 6/2008 | Sturgin | F16D 25/10 192/3.25 |
| 2014/0021000 A1 | 1/2014 | Hemphill et al. | |

FOREIGN PATENT DOCUMENTS

EP 0997666 A2 5/2000

* cited by examiner

*Primary Examiner* — F Daniel Lopez
*Assistant Examiner* — Daniel S Collins

(57) ABSTRACT

A torque converter, including: an impeller arranged to receive torque and including an impeller shell and at least one impeller blade fixed to the impeller shell; and a turbine including a turbine shell including a slot with an open end circumferentially located between first and second radially outermost portions of the turbine shell and at least one turbine blade fixed to the turbine shell; and an inertia ring fixed to the turbine shell and including a tab with a segment located in the slot.

20 Claims, 9 Drawing Sheets

TORQUE CONVERTER WITH A FINGER-TABBED BRAZED INERTIA RING

TECHNICAL FIELD

The present disclosure relates to a torque converter with an inertia ring, in particular, an inertia ring fixed to the turbine shell by tabs in slots in a radially outer portion of the turbine shell and by fingers in openings in the turbine shell radially inward of the slots.

BACKGROUND

An inertia ring is desired on the turbine of a torque converter to improve efficiency and certain noise, vibration and harshness (NVH) characteristics. A durable attachment method is necessary, and brazing is preferred in conjunction with current turbine blade assembly methodology. An inner surface of the turbine, turbine blades and a core ring face up during brazing operations securing the turbine blades to the inner surface and securing the core ring to the turbine blades. Holding the inertia ring in place against an outer surface of the turbine shell (facing downwards) while the inner surface faces up is essential for a durable attachment. Multiple fixtures on a brazing furnace belt could be used to hold the inertia ring in place; however, many problems and considerable costs would be associated with the use of multiple fixtures.

For U.S. Pat. No. 4,844,216 A, a mass is connected to a damper, not to a turbine. Therefore, the mass provides a damper inertia, not a direct inertia. U.S. Pat. No. 5,195,621 welds an inertial mass to a turbine shell. However, welding weakens brazed turbine blade joints and reduces turbine blade durability. Further, the mass is relatively large and the large size of the mass results in a slower take-off. U.S. Pat. No. 6,648,112 uses welding to attach an inertial mass to a turbine shell for a torque converter to increase inertia of the turbine. However, welding weakens brazed turbine blade joints and reduces turbine blade durability. Further, the mass is relatively large, which results in a slower take-off. U.S. Pat. No. 6,789,446 B2 uses welding to attach a ring gear to a cover for a torque converter to increase inertia of the cover. As a result, inertia from the ring gear acts in different modes than a ring on only the turbine. U.S. Pat. No. 8,763,775 adds mass to the intermediate mass in the damper and not to turbine (which would add mass to the transmission input shaft). Thus, the mass provides a different mode for NVH and efficiency. U.S. Patent Application Publication No. 2004/0226794 adds mass (inertia) to the intermediate mass in the damper and not to the turbine (which would add mass directly to the transmission input shaft). Thus, the mass provides a different mode for NVH and efficiency.

SUMMARY

According to aspects illustrated herein, there is provided a torque converter, including: an impeller arranged to receive torque and including an impeller shell and at least one impeller blade fixed to the impeller shell; a turbine including a turbine shell including a slot with an open end circumferentially located between first and second radially outermost portions of the turbine shell, and at least one turbine blade fixed to the turbine shell; and an inertia ring fixed to the turbine shell and including a tab with a segment located in the slot.

According to aspects illustrated herein, there is provided a torque converter, including: a cover arranged to receive torque; an impeller including an impeller shell non-rotatably connected to the cover and at least one impeller blade fixed to the impeller shell; a turbine including a turbine shell and an inertia ring. The turbine shell includes: an outer surface; an inner surface; an opening connecting the inner and outer surfaces of the turbine shell; and at least one turbine blade fixed to the inner surface of the turbine shell. The inertia ring is fixed to the outer surface of the turbine shell and includes a finger with a radially innermost surface of the inertia ring, and a segment located in the opening.

According to aspects illustrated herein, there is provided a torque converter, including: a cover arranged to receive torque; an impeller including an impeller shell non-rotatably connected to the cover and at least one impeller blade fixed to the impeller shell; a turbine; and an inertia ring. The turbine includes: a turbine shell including an inner surface and an outer surface, at least one turbine blade connected to the inner surface, a slot, and an opening connecting the inner and outer surfaces and located radially inward of the slot. The includes: a tab with a segment located in the slot; and a finger including a radially innermost surface of the inertia ring and with a segment located in the opening.

BRIEF DESCRIPTION OF THE DRAWINGS

Various embodiments are disclosed, by way of example only, with reference to the accompanying schematic drawings in which corresponding reference symbols indicate corresponding parts, in which.

DETAILED DESCRIPTION

At the outset, it should be appreciated that like drawing numbers on different drawing views identify identical, or functionally similar, structural elements of the disclosure. It is to be understood that the disclosure as claimed is not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the present disclosure.

Unless defined otherwise, all technical and scientific terms used herein have the same meaning as commonly understood to one of ordinary skill in the art to which this disclosure belongs. It should be understood that any methods, devices or materials similar or equivalent to those described herein can be used in the practice or testing of the disclosure.

Figure 1:
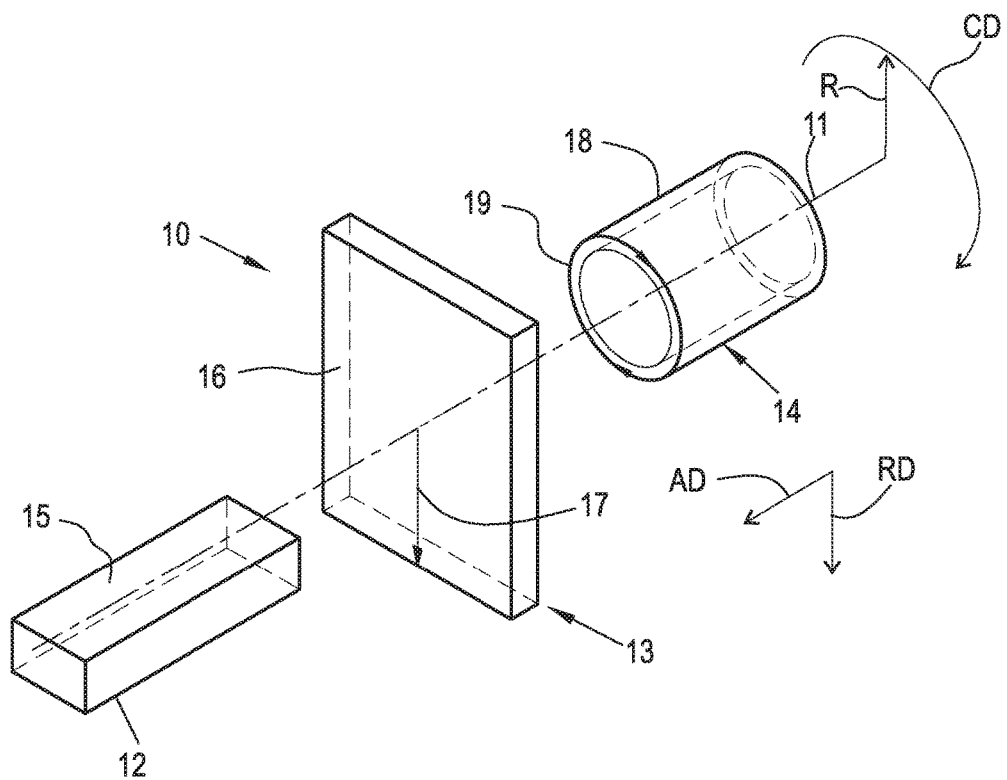
FIG. 1 is a perspective view of a cylindrical coordinate system demonstrating spatial terminology used in the present application.

FIG. 1 is a perspective view of cylindrical coordinate system 10 demonstrating spatial terminology used in the present application. The present application is at least partially described within the context of a cylindrical coordinate system. System 10 includes longitudinal axis 11, used as the reference for the directional and spatial terms that follow. Axial direction AD is parallel to axis 11. Radial direction RD is orthogonal to axis 11. Circumferential direction CD is defined by an endpoint of radius R (orthogonal to axis 11) rotated about axis 11.

To clarify the spatial terminology, objects 12, 13, and 14 are used. An axial surface, such as surface 15 of object 12, is formed by a plane co-planar with axis 11. Axis 11 passes through planar surface 15; however any planar surface co-planar with axis 11 is an axial surface. A radial surface, such as surface 16 of object 13, is formed by a plane orthogonal to axis 11 and co-planar with a radius, for example, radius 17. Radius 17 passes through planar surface 16; however any planar surface co-planar with radius 17 is a radial surface. Surface 18 of object 14 forms a circumferential, or cylindrical, surface. For example, circumference 19 is passes through surface 18. As a further example, axial movement is parallel to axis 11, radial movement is orthogonal to axis 11, and circumferential movement is parallel to circumference 19. Rotational movement is with respect to axis 11. The adverbs "axially," "radially," and "circumferentially" refer to orientations parallel to axis 11, radius 17, and circumference 19, respectively. For example, an axially disposed surface or edge extends in direction AD, a radially disposed surface or edge extends in direction R, and a circumferentially disposed surface or edge extends in direction CD.

Figure 2:
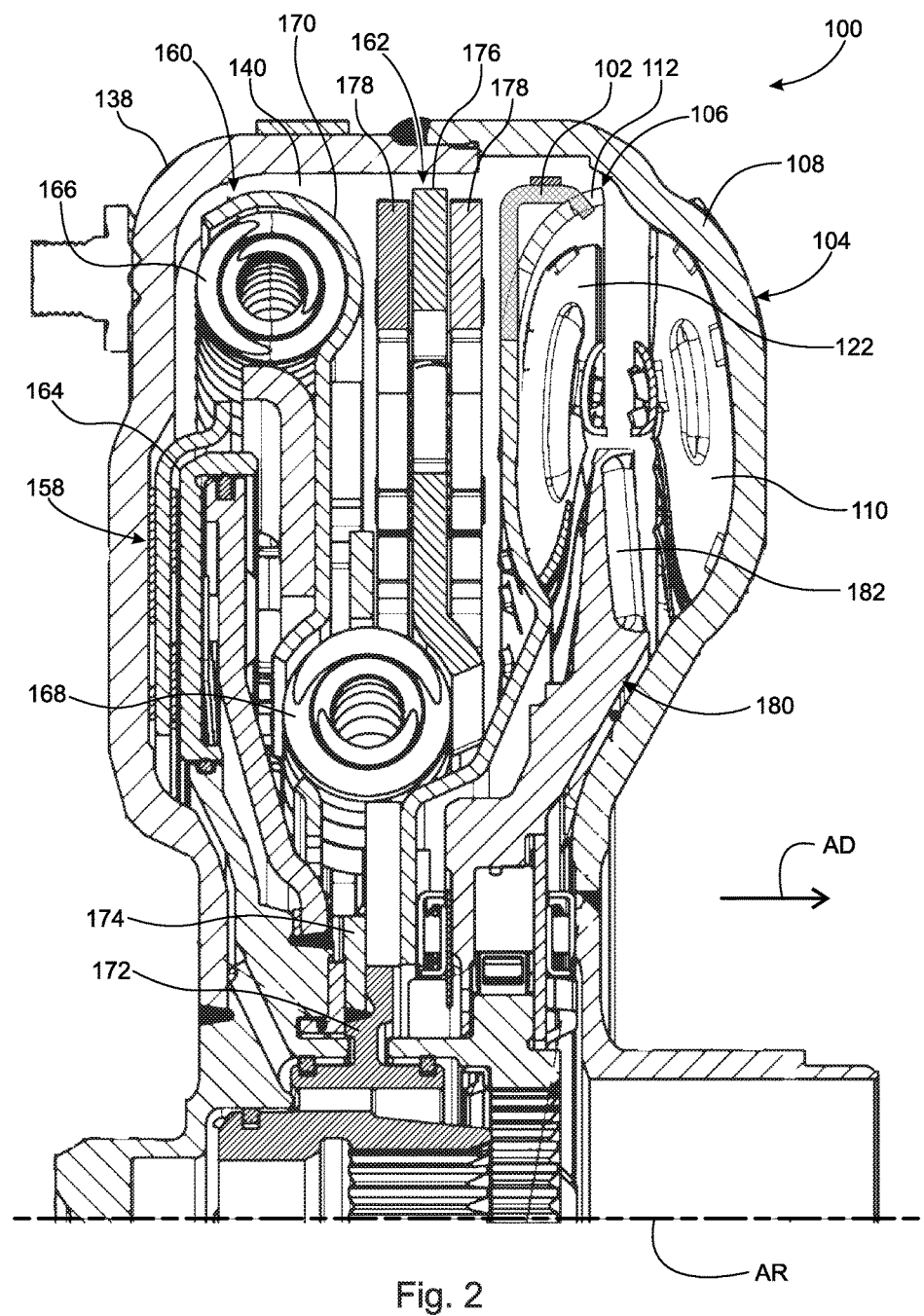
FIG. 2 is a partial cross-sectional view of an example embodiment of a torque converter with a finger-tabbed brazed inertia ring.

FIG. 2 is a partial cross-sectional view of an example embodiment of torque converter 100 with finger-tabbed brazed inertia ring 102

Figure 3:
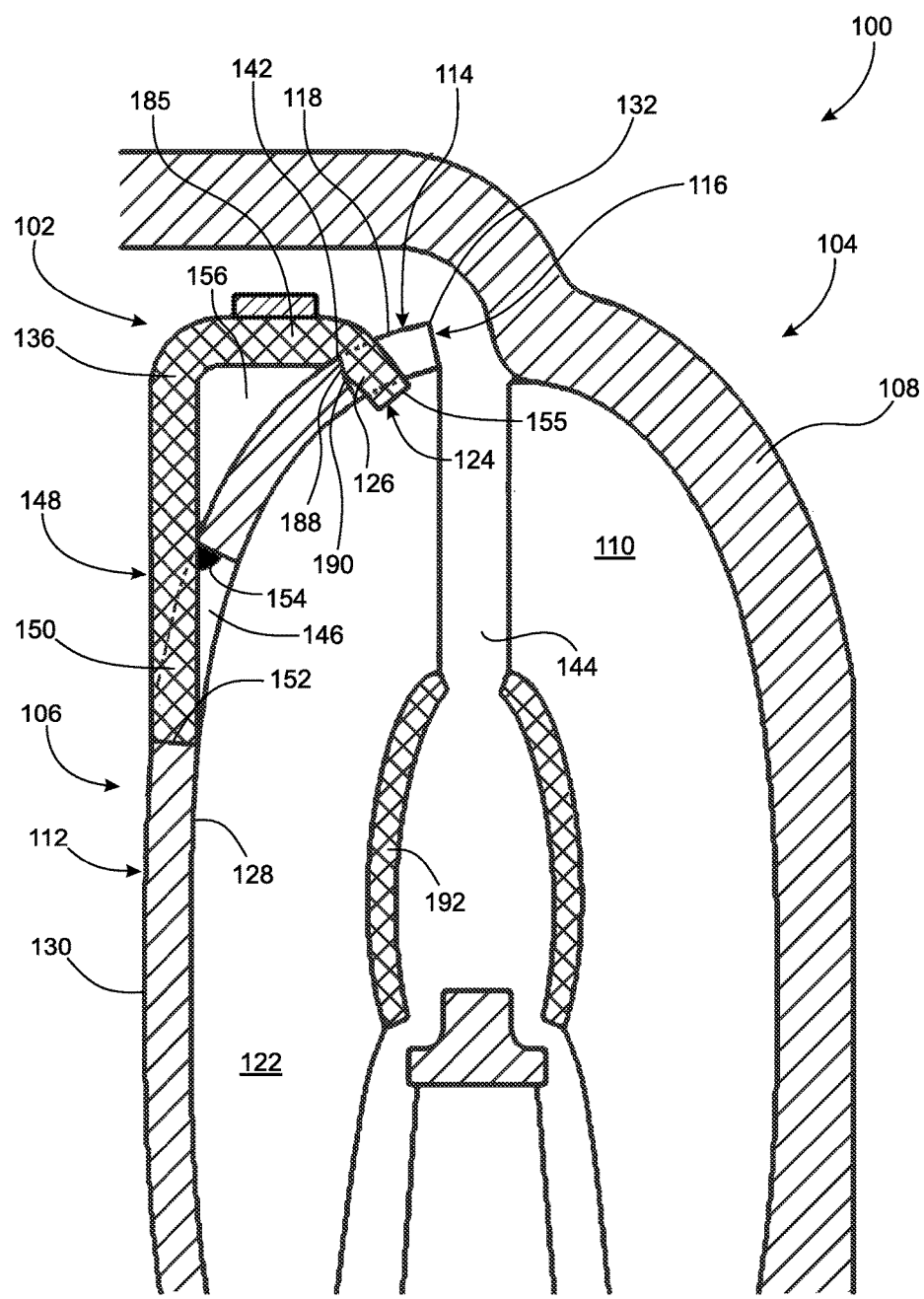
FIG. 3 is a detail of a portion of FIG. 2, showing the impeller and turbine of FIG. 2.

FIG. 3 is a detail of a portion of FIG. 2, showing the impeller and turbine of FIG. 2.

Figure 4:
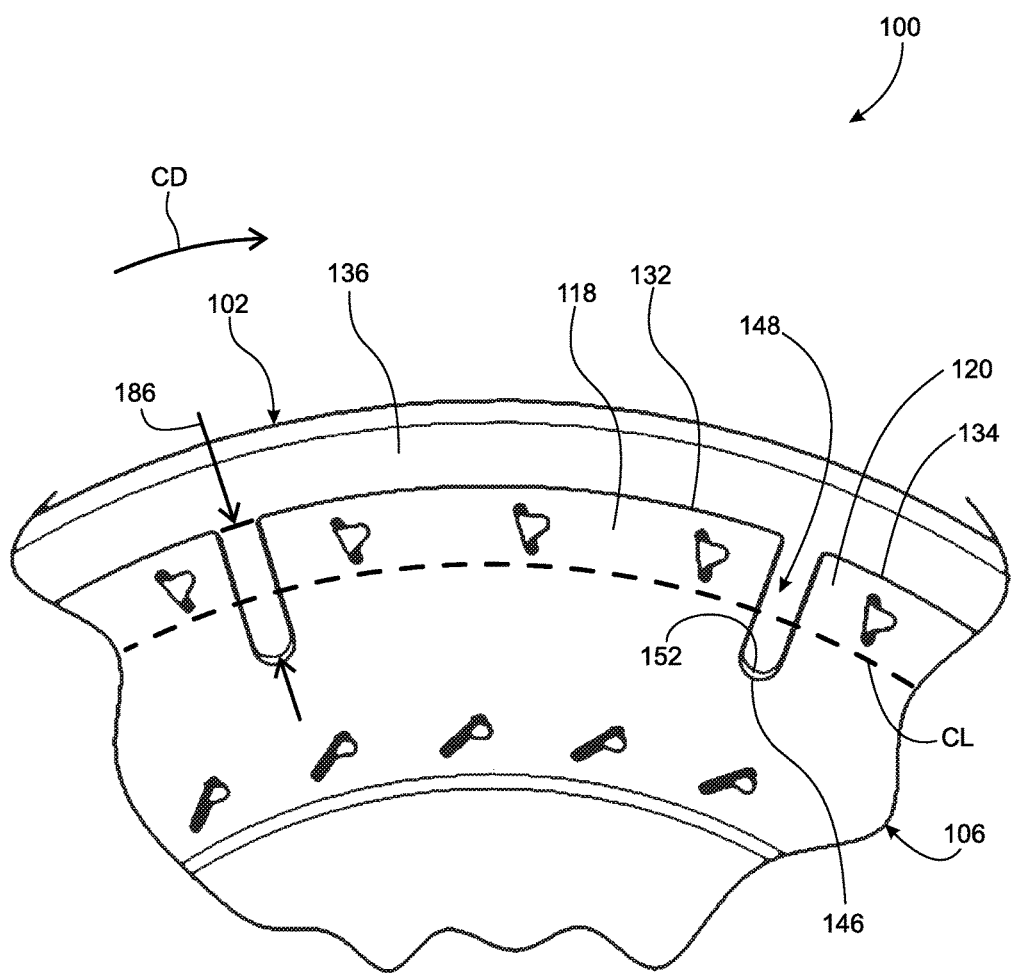
FIG. 4 is a partial front view of the inertia ring and turbine shell in FIG. 2.

FIG. 4 is a partial front view of inertia ring 102 and the turbine shell in FIG. 2.

Figure 5:
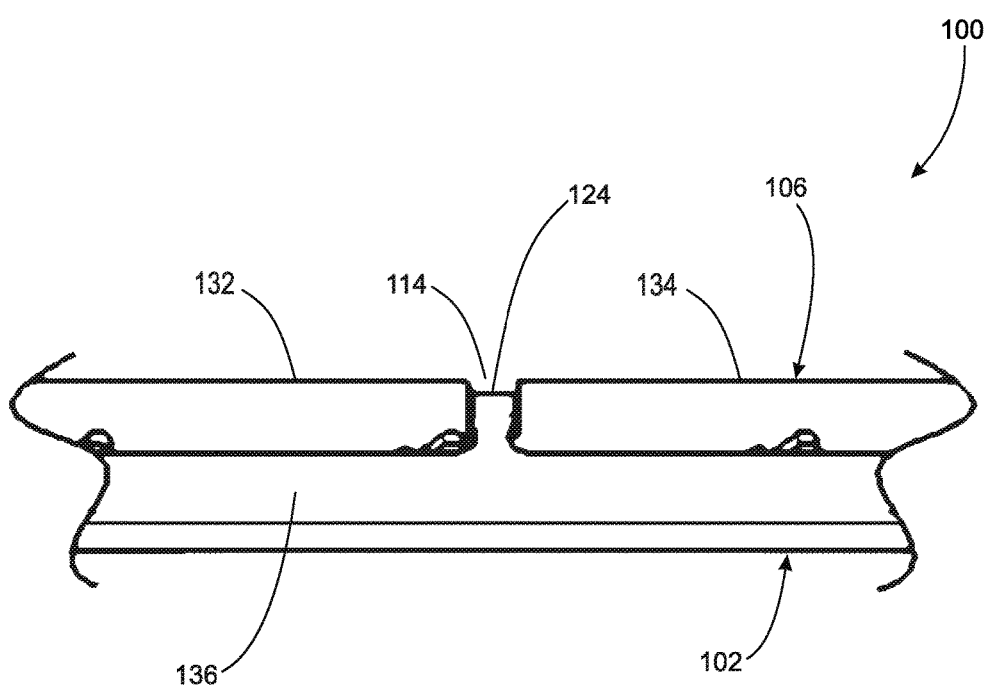
FIG. 5 is a partial plan view detail of the inertia ring and turbine shell in FIG. 2.

FIG. 5 is a partial plan view detail of inertia ring 102 and the turbine shell in FIG. 2. The following should be viewed in light of FIGS. 2 through 5. Torque converter 100 includes axis of rotation AR, ring 102, impeller 104, and turbine 106. Impeller 104 is arranged to receive torque and includes impeller shell 108 and at least one impeller blade 110 fixed to impeller shell 108, for example by brazing. Turbine 106 includes turbine shell 112 including slot 114 with open end 116 circumferentially located between radially outermost portions 118 and 120 of turbine shell 112. Turbine 106 includes at least one turbine blade 122 fixed to turbine shell 112 by brazing. Inertia ring 102 is fixed to turbine shell 112 and includes tab 124 with segment 126 located in slot 114.

Turbine shell 112 includes inner surface 128 and outer surface 130. In an example embodiment, turbine blade 122 is in contact with inner surface 128 and inertia ring 102 is in contact with outer surface 130. In an example embodiment, portions 118 and 120 include radially outermost edges 132 and 134, respectively, of shell 112, and open end 116 is circumferentially disposed between edges 132 and 134.

Inertia ring 102 includes body 136. In an example embodiment, body 136 is L shaped in a radial cross-section. For example, body 136 is L shaped in FIGS. 2 and 3. Tab 124 extends from body 136 in direction AD and then bends radially inward along direction AD. Line CL, in circumferential direction CD, pass through in sequence, portion 118, segment 126, and portion 120.

Torque converter 100 includes: cover 138 arranged to receive torque and non-rotatably connected to impeller shell 108; and space 140 formed in part by cover 138, shell 108 and shell 112. Inertia ring 102 is disposed in space 140.

In an example embodiment, tab 124 includes notch 142 connecting body 136 with segment 126 of tab 124. Notch 142 is in contact with turbine shell 112. Segment 126 extends past notch 142 toward the impeller shell, for example in direction AD, and radially inward from notch 142.

Torque converter 100 includes space 144 bounded in part by impeller shell 108 turbine shell 112. Space 144 does not extend radially outward of turbine shell 112. Blades 110 and 122 are located in space 144. Tab 124, for example segment 126, forms a portion of a boundary for space 144. That is, tab 124 is in communication with space 144.

Turbine shell 112 includes opening 146 connecting surfaces 128 and 130 of turbine shell 112, and wholly surrounded by material forming shell 112. Inertia ring 102 includes finger 148 with segment 150 located in opening 146. Finger 148 extends radially inward from body 136. Segment 150 includes surface 152. In an example embodiment, surface 152 is a radially innermost surface of inertia ring 102.

In an example embodiment, torque converter 100 includes brazing material 154 in contact with finger 148 and shell 112 and fixing finger 148 (and ring 102) to shell 112. In an example embodiment, finger 148 forms a portion of the boundary for space 144. That is, finger 148, for example segment 150, is in communication with space 144. In the example embodiment of FIGS. 2 through 5, end 155 of segment 126 extends into space 144.

In an example embodiment, space 156 is formed between ring 102 and turbine shell 112, for example, between body 136 and surface 130.

In an example embodiment, torque converter 100 includes lockup clutch 158, torsional vibration damper 160, and pendulum vibration absorber 162. Clutch 158 includes axially displaceable piston 164. Damper 160 includes at least one spring 166 and at least one spring 168, located radially inward of spring 166. Clutch 158, when closed, is arranged to transmit torque from cover 138 to damper 160, in particular springs 166, in a lockup mode for torque converter 100. Cover plate 170 is arranged to transmit torque from spring 166 to spring 168 and spring 168 is arranged to transmit torque to output hub 172 via flange 174. Hub 172 is arranged to connect to an input shaft (not shown) for a transmission (not shown). Turbine shell 112 is non-rotatably connected to hub 172. By "non-rotatably connected" components, we mean that whenever one of the components rotates all of the components rotate, that is, none of the components is rotatable with respect to any of the other components. Absorber 162 includes flange 176 non-rotatably connected to flange 174 and includes pendulum masses 178 connected to flange 176.

Torque converter 100 includes stator 180 with blades 182 disposed between impeller 104 and turbine 106.

In the example embodiment of FIGS. 2 through 5, turbine shell 112 includes a plurality of openings 146, and ring 102 includes a plurality of fingers 148. Torque converter 100 is not limited to any particular number of openings 146 or fingers 148. In an example embodiment (not shown), shell 112 includes multiple slots 114 and ring 102 includes multiple tabs 124.

Figure 6:
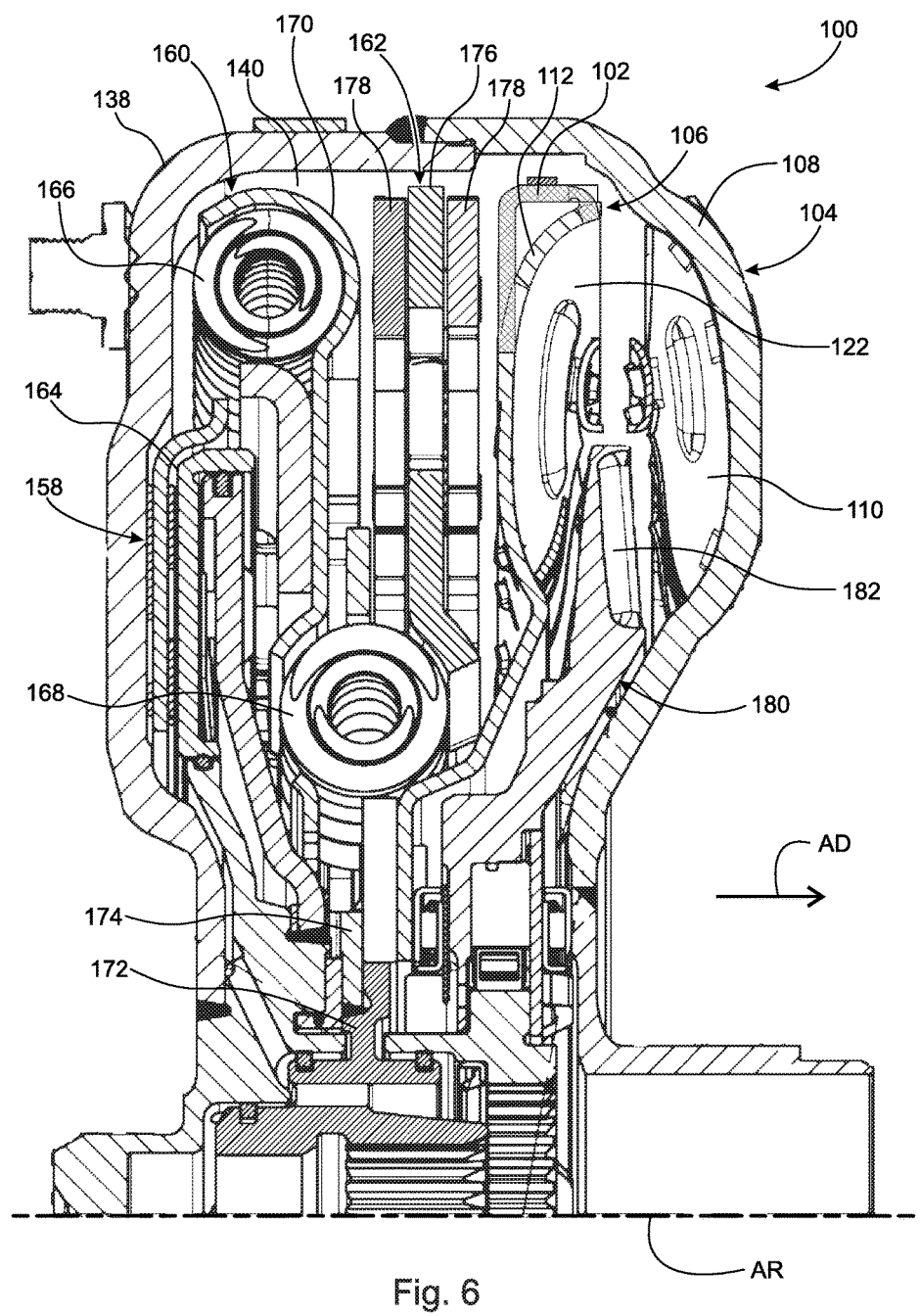
FIG. 6 is a partial cross-sectional view of an example embodiment of a torque converter with a finger-tabbed brazed inertia ring.

FIG. 6 is a partial cross-sectional view of an example embodiment of torque converter 100 with finger-tabbed brazed inertia ring 102.

Figure 7:
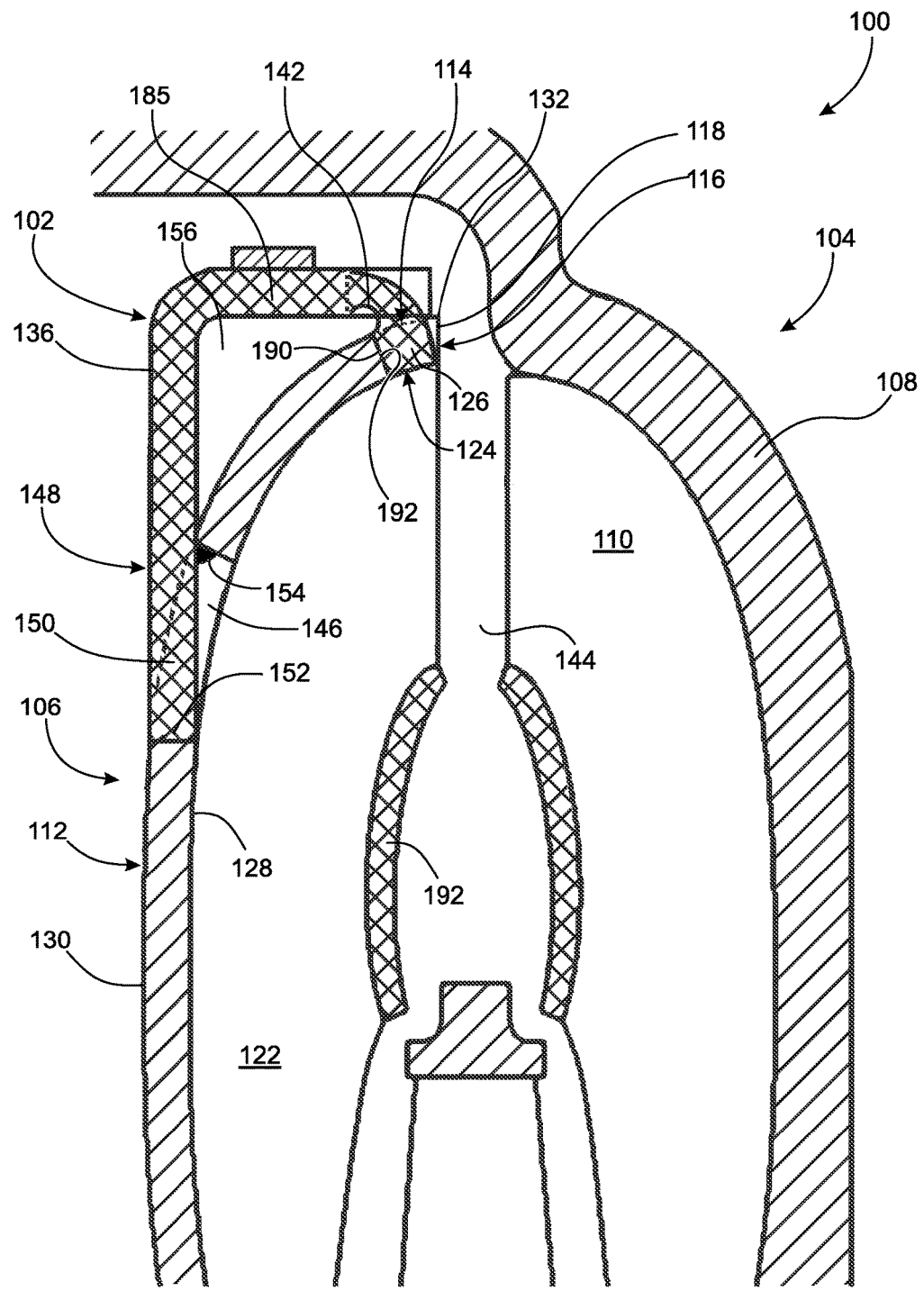
FIG. 7 is a detail of a portion of FIG. 6, showing the impeller and turbine of FIG. 6.

FIG. 7 is a detail of a portion of FIG. 6, showing the impeller and turbine of FIG. 6.

Figure 8:
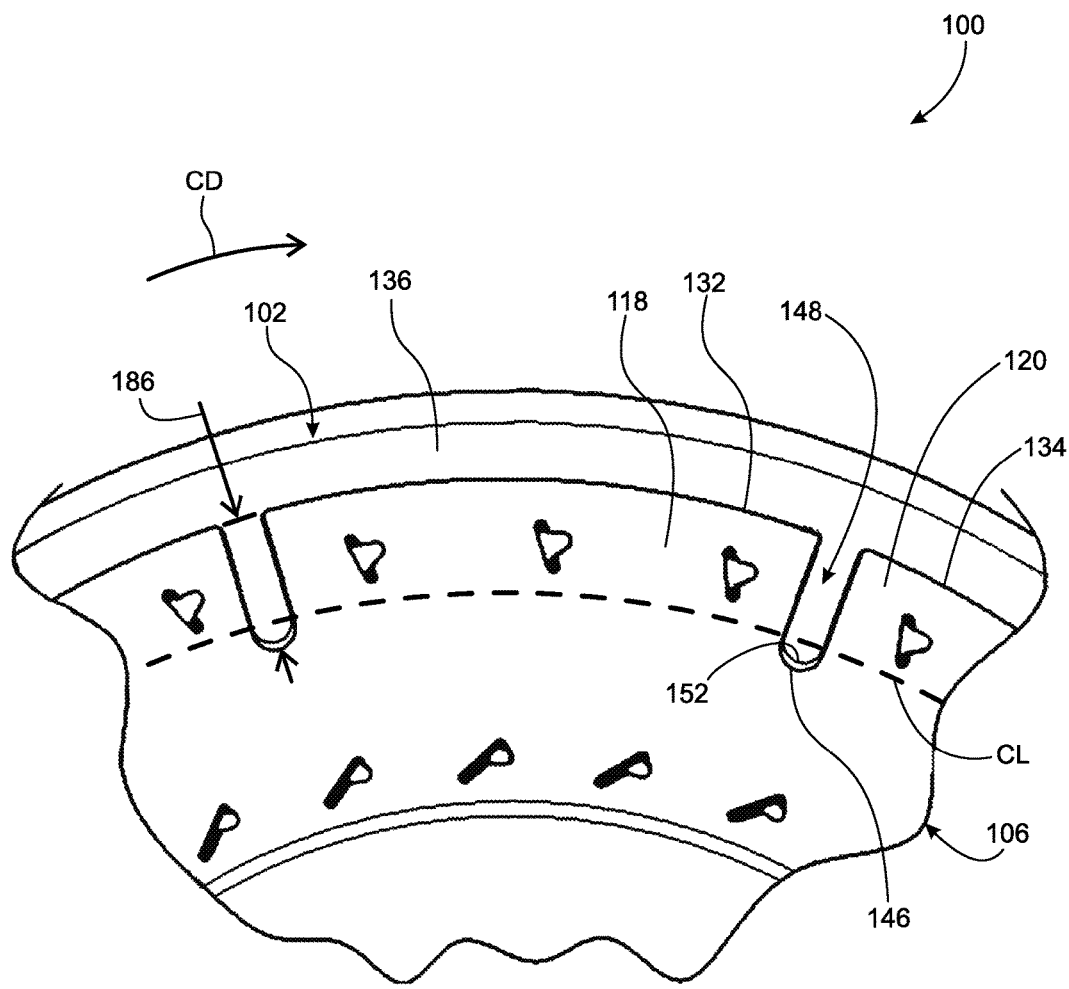
FIG. 8 is a partial front view of the inertia ring and turbine shell in FIG. 6; and, FIG. 9 is a partial plan view detail of the inertia ring and turbine shell in FIG. 6.

FIG. 8 is a partial front view of inertia ring 102 and the turbine shell in FIG. 6.

Figure 9:
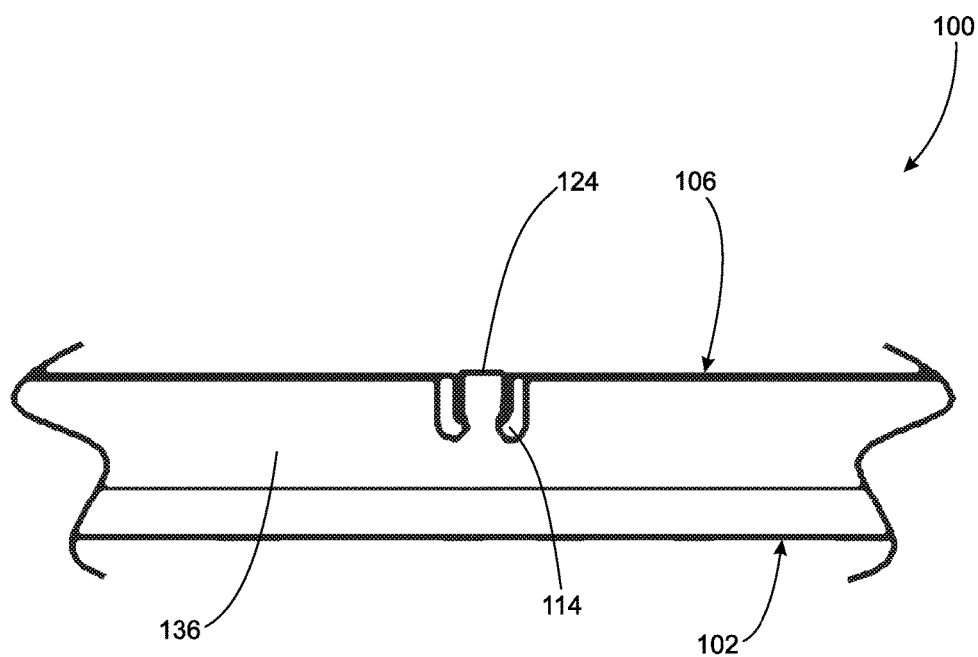

FIG. 9 is a partial plan view detail of inertia ring 102 and the turbine shell in FIG. 6. The following should be viewed in light of FIGS. 2 through 9. The discussion for and description of torque converter 100 in FIGS. 2 through 5 is applicable to torque converter 100 in FIGS. 5 through 7 except as noted in the following discussion and description. Segment 126 does not extend into space 144 and portion 185 of body 136 is radially outward of turbine 106. In the example embodiment of FIGS. 6 through 9, length 186 of finger 148 is larger than in the example embodiment of FIGS. 2 through 5 and thus finger 148 in FIGS. 6 through 9 generates more inertia than finger 148 in FIGS. 2 through 5.

The following discussion is applicable to FIGS. 2 through 9. A durable attachment method is necessary for attaching an inertia ring to a turbine, and brazing is preferred in conjunction with the current turbine blade assembly methodology. Advantageously, the configuration of ring 102 and shell 112 enables ring 102 to be brazed to turbine shell 112 without the use of multiple fixtures or other costly modifications to existing methods of brazing turbine blades to a turbine shell. For example, tab 124 is inserted in slot 114 and segment 126 is bent radially inward. In the example embodiment of FIGS. 2 through 5, notch 142 contacts edge 188 of shell 112 and tab 124 wraps partially about surfaces 130 and 190 of shell 112. Finger 148 is inserted in opening 146. In the example embodiment of FIGS. 6 through 9, surface 192 of tab 124 contacts surface 190. Finger 148 is inserted in opening 146.

As noted above, turbine 106 is then tipped so that inner surface 128, turbine blade 122 and core ring 192 face up for brazing operations to secure turbine blade 122 to inner surface 128 and to secure core ring 192 to turbine blade 122. In the tipped position, tab 124 holds inertia ring 102 in place against outer surface 130 (facing downwards) while inner surface 128 faces up. In the example embodiment of FIGS. 2 through 5, the interface of notch 142, edge 188 and surface 190 provides a large part of the force holding ring 102 in place during brazing operations. In the example embodiment of FIGS. 6 through 6, the interface of surfaces 190 and 192 provides a large part of the force holding ring 102 in place during brazing operations. Holding ring 102 in place ensures a durable attachment of ring 102 to shell 112. Brazing material 154 flows into opening 146 to secure ring 102 to turbine 106.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

The invention claimed is:

1. A torque converter, comprising:
an axis of rotation;
an impeller arranged to receive torque and including an impeller shell and at least one impeller blade fixed to the impeller shell;
a turbine including:
a turbine shell including:
a first radially outermost edge;
a second radially outermost edge; and,
a slot with an open end circumferentially located between:
first and second radially outermost portions of the turbine shell; and,
the first radially outermost edge and the second radially outermost edge; and,
at least one turbine blade fixed to the turbine shell; and,
an inertia ring fixed to the turbine shell and including a tab with a segment located in the slot.

2. The torque converter of claim 1, wherein:
the inertia ring includes an L shaped body in a radial cross-section; and,
the tab extends from the L shaped body:
toward the impeller shell in an axial direction; and,
radially inward.

3. The torque converter of claim 1, wherein a line in a circumferential direction passes through, in sequence:
the first radially outermost portion of the turbine shell;
the tab; and,
the second radially outermost portion of the turbine shell.

4. The torque converter of claim 1, further comprising:
a cover arranged to receive torque and non-rotatably connected to the impeller shell; and,
a space bounded in part by the cover, the impeller shell and the turbine shell, wherein the inertia ring is disposed in the space.

5. The torque converter of claim 1, wherein:
the inertia ring includes an L shaped body in a radial cross-section;
the tab extends from the L shaped body:
toward the impeller shell in an axial direction; and,
radially inward; and,
the tab includes a notch:
connecting the L shaped body and the segment of the tab; and,
in contact with the turbine shell.

6. The torque converter of claim 5, wherein the segment of the tab extends:
past the notch toward the impeller shell; and,
radially inward from the notch.

7. The torque converter of claim 1, further comprising:
a space bounded in part by the impeller shell and the turbine shell, wherein:
the space does not extend radially outward of the turbine shell;
the at least one impeller blade and the at least one turbine blade are located in the space; and,
the tab forms a portion of a boundary for the space.

8. The torque converter of claim 1, wherein:
the turbine shell includes an inner surface and an outer surface;
the at least one turbine blade is fixed to the inner surface of the turbine shell;
the turbine shell includes an opening connecting the inner and outer surfaces of the turbine shell; and,
the inertia ring includes a finger with a segment located in the opening.

9. The torque converter of claim 8, wherein the finger includes a radially innermost surface of the inertia ring.

10. The torque converter of claim 8, wherein:
the inertia ring includes an L shaped body in a cross-section formed by a plane parallel to the axis of rotation and passing through the axis of rotation; and,
the finger extends radially inward from the L shaped body.

11. The torque converter of claim 1, wherein:
the inertia ring includes an L shaped body in a radial cross-section; and,
a portion of the L shaped body is located radially outward of the turbine shell.

12. A torque converter, comprising:
an axis of rotation;
a cover arranged to receive torque;
an impeller including:
    an impeller shell non-rotatably connected to the cover; and,
    at least one impeller blade fixed to the impeller shell;
a turbine including:
    a turbine shell including:
        an outer surface and an inner surface; and,
        an opening connecting the inner and outer surfaces of the turbine shell; and,
    at least one turbine blade fixed to the inner surface of the turbine shell; and,
an inertia ring fixed to the outer surface of the turbine shell and including a finger with:
    a radially innermost surface of the inertia ring; and,
    a segment located in the opening.

13. The torque converter of claim 12, further comprising:
a space at least partially enclosed by the inertia ring and the turbine shell.

14. The torque converter of claim 12, further comprising:
brazing material in contact with the turbine shell and the finger.

15. The torque converter of claim 12, wherein:
the inertia ring includes an L shaped body in a radial cross-section; and,
the finger extends radially inward from the L shaped body.

16. The torque converter of claim 12, wherein the finger includes a radially innermost surface of the inertia ring.

17. The torque converter of claim 12, wherein:
the turbine shell includes a slot located radially outward of the opening; and,
the inertia ring includes a tab with a segment located in the slot.

18. The torque converter of claim 17, wherein:
the inertia ring includes an L shaped body in a radial cross-section;
the tab extends from the L shaped body:
    toward the impeller shell in an axial direction; and,
    radially inward; and,
the tab includes a notch:
    connecting the L shaped body and the segment of the tab; and,
    in contact with the outer surface of the turbine shell.

19. The torque converter of claim 17, further comprising:
a space bounded in part by the impeller shell and the turbine shell, wherein:
    the at least one impeller blade and the at least one turbine blade are located in the space;
    the space does not extend radially outward of the turbine shell; and,
    the finger and the tab form respective portions of a boundary for the space.

20. A torque converter, comprising:
a cover arranged to receive torque;
an impeller including:
    an impeller shell non-rotatably connected to the cover; and,
    at least one impeller blade fixed to the impeller shell;
a turbine including:
    a turbine shell including:
        an inner surface and an outer surface;
        at least one turbine blade connected to the inner surface;
        a slot; and,
        an opening connecting the inner and outer surfaces and located radially inward of the slot; and,
an inertia ring including:
    a tab with a segment located in the slot; and,
    a finger:
        including a radially innermost surface of the inertia ring; and,
        with a segment located in the opening.

* * * * *